United States Patent [19]

Wilson

[11] 4,146,314
[45] Mar. 27, 1979

[54] AUDIO VISUAL SYSTEM HAVING RECORDED MOVING LIGHT POINTER AND METHOD

[75] Inventor: Stewart W. Wilson, Concord, Mass.

[73] Assignee: Polaroid Corporation, Cambridge, Mass.

[21] Appl. No.: 873,701

[22] Filed: Jan. 30, 1978

[51] Int. Cl.² .......................................... G03B 21/00
[52] U.S. Cl. ................................................. 353/42
[58] Field of Search .......................................... 353/42

[56] References Cited

U.S. PATENT DOCUMENTS

| 1,119,597 | 12/1914 | Henry | 353/42 |
|---|---|---|---|
| 2,848,922 | 8/1958 | Field | 353/42 |
| 3,220,305 | 11/1965 | Van Gelder et al. | 353/42 |
| 3,552,037 | 1/1971 | Stern | 353/42 |
| 3,804,503 | 4/1974 | Sissona | 353/15 |
| 3,832,050 | 8/1974 | Johannsen | 353/42 |
| 4,060,318 | 11/1977 | Hansford | 353/42 |

FOREIGN PATENT DOCUMENTS

| 352837 | 4/1961 | Switzerland | 353/42 |
|---|---|---|---|
| 1435510 | 5/1976 | United Kingdom | 353/42 |

*Primary Examiner*—Steven L. Stephan
*Attorney, Agent, or Firm*—David R. Thornton

[57] ABSTRACT

An automatic pointer for audio-visual systems superimposes a bright highlighting spot on a sequence of visual images. The spot is continuously movable over each image in coordination with the audio program. Movement of the spot is programmed initially through a transducer that translates the position of a thumb into electrical signals. One pointer movement mechanism for a front screen projector employs a pair of mutually perpendicular frames that support an apertured mask which defines the pointer image. Stepping motors acting through a gear train move the frames to position the pointer spot. A preferred pointer movement mechanism for a rear screen viewer employs a twisting mirror.

In a preferred form for front screen slide projection, the pointer mechanism mounts a standard slide projector with the slide projection lens vertically spaced from the pointer projection lens. A mechanical linkage to the focus control of the pointer projector automatically corrects for parallax problems due to this separation between the two projection lenses. Alternatively, the pointer projector can execute a programmed pattern that outlines a centered visual image and the slide projector itself can be adjusted so that its actual projected image coincides with the outline.

14 Claims, 18 Drawing Figures

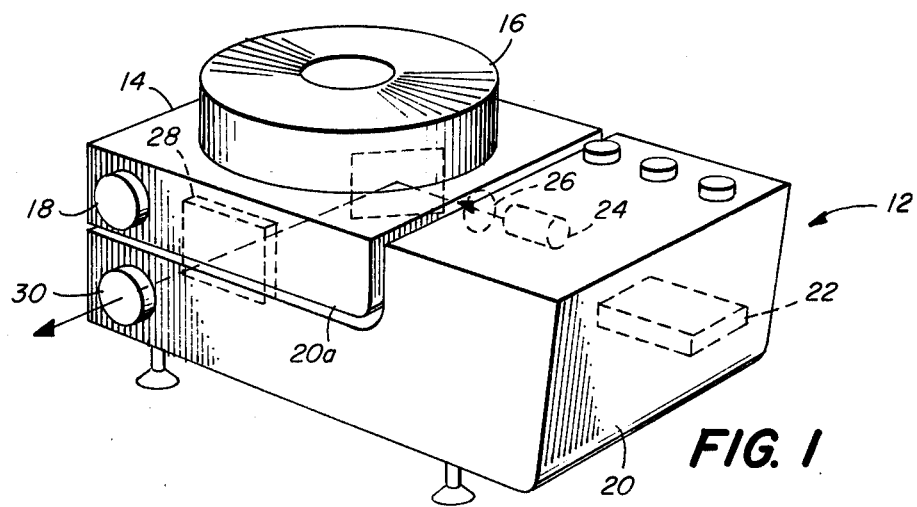
FIG. 1
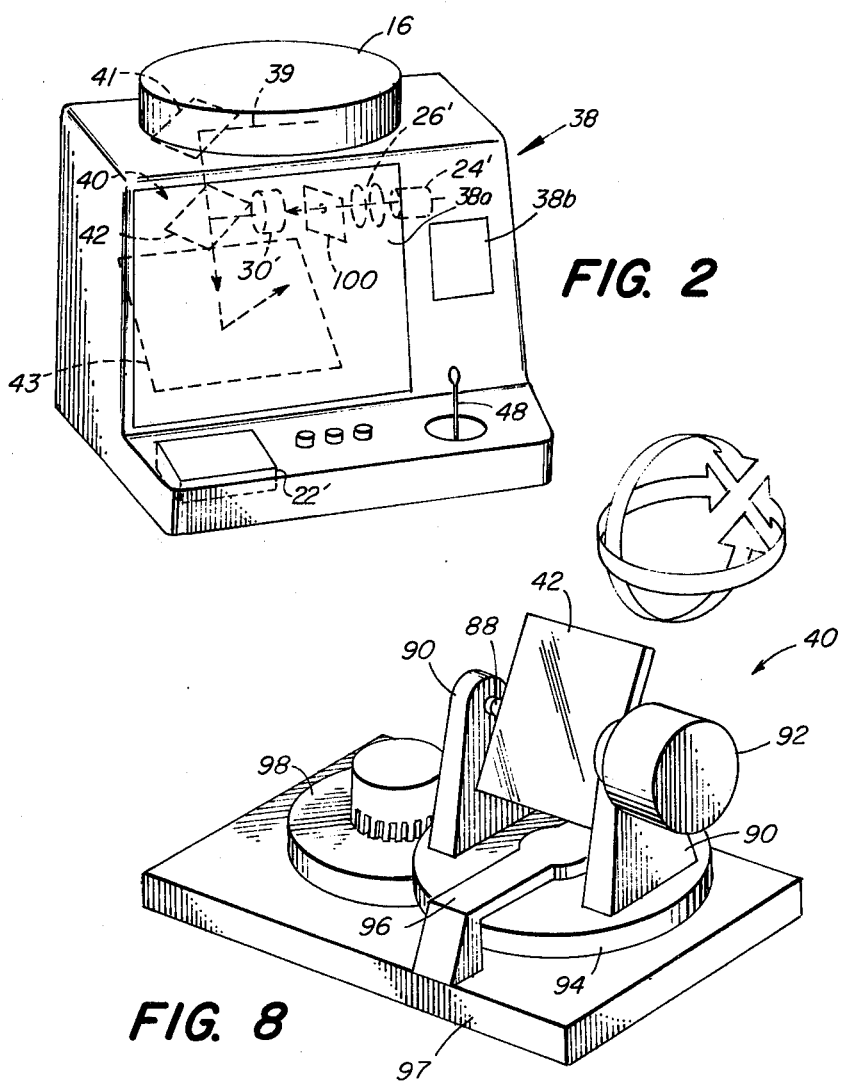
FIG. 2
FIG. 8

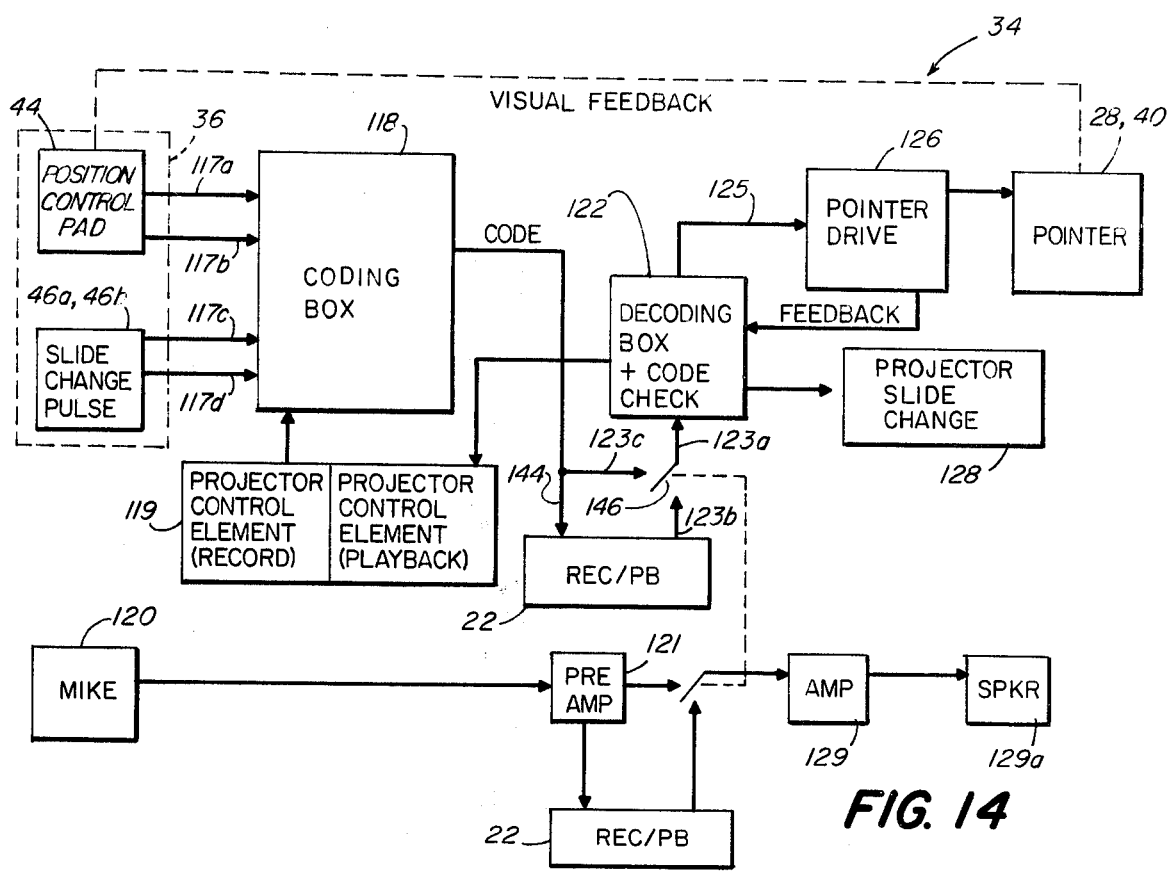
FIG. 14
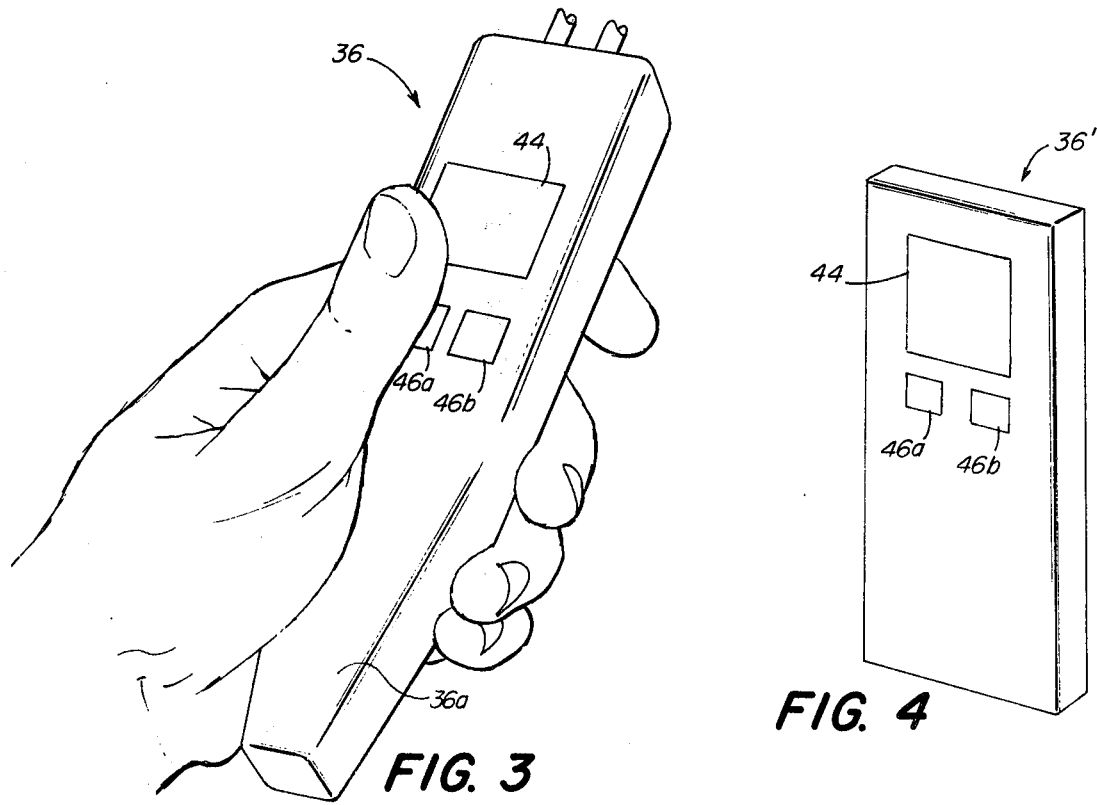
FIG. 3
FIG. 4

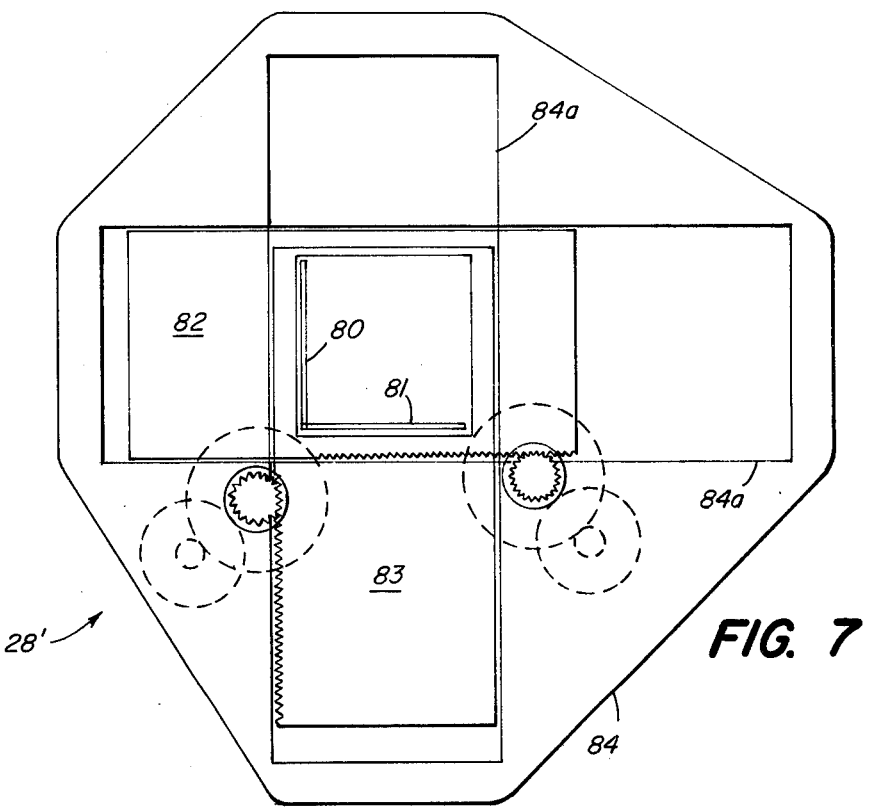
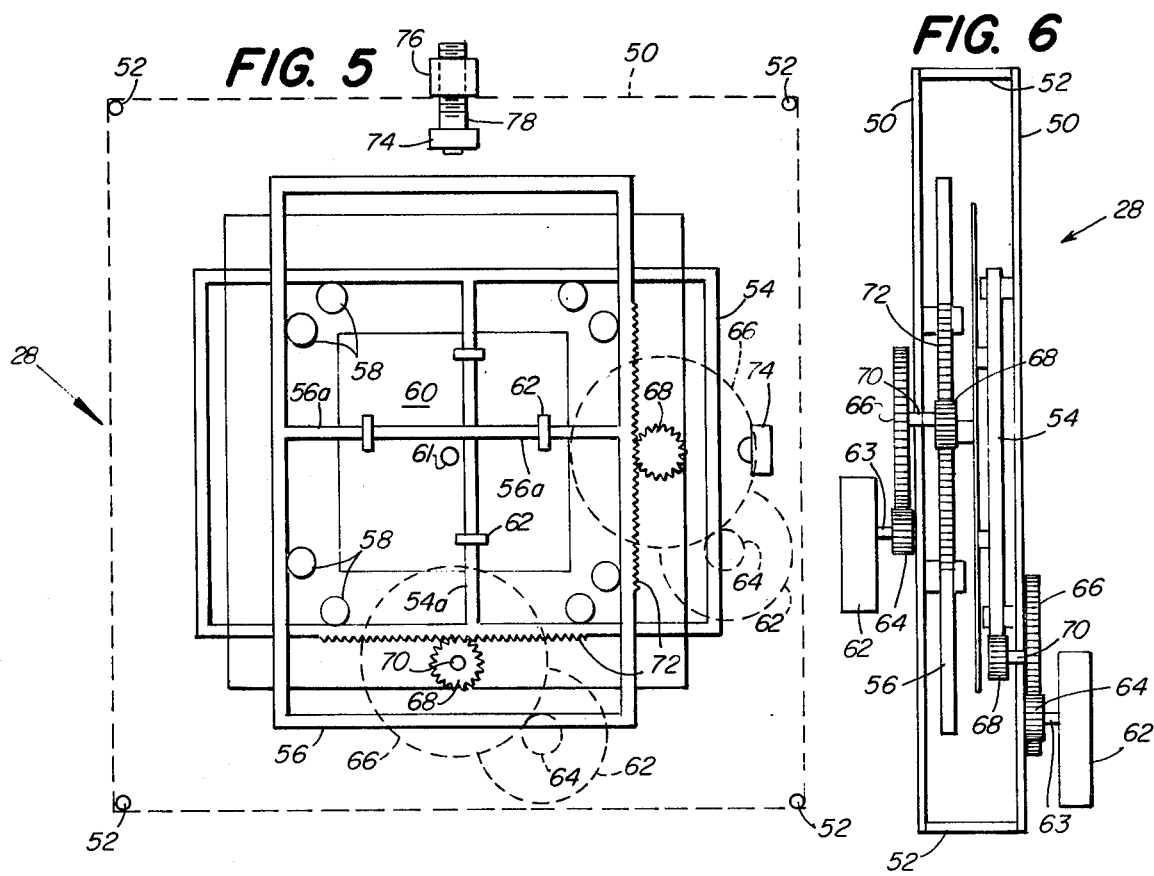

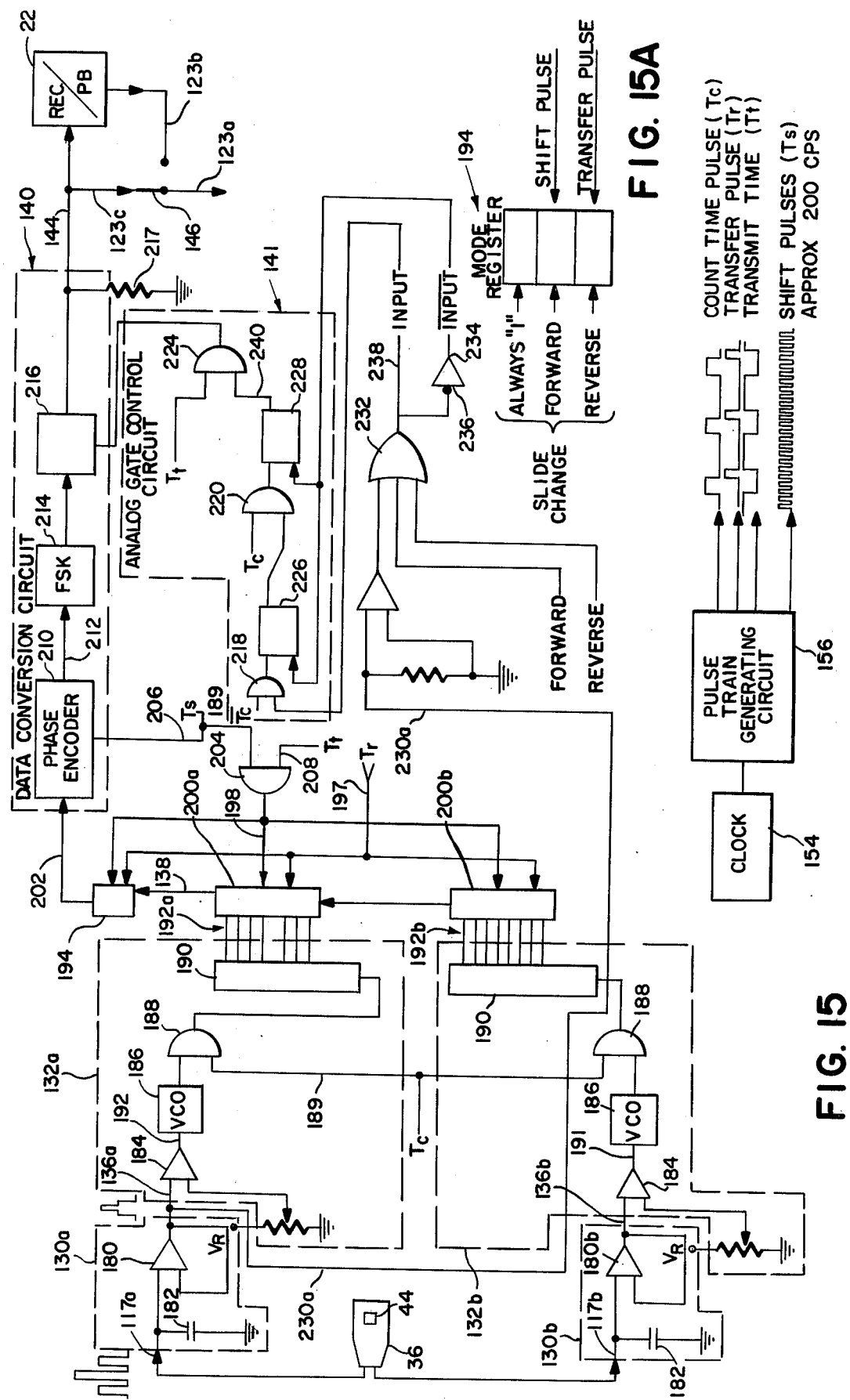

AUDIO VISUAL SYSTEM HAVING RECORDED MOVING LIGHT POINTER AND METHOD

BACKGROUND OF THE INVENTION

This invention relates in general to audio-visual systems for recording and conveying information between people. More specifically, it relates to an automatic pointer mechanism that superimposes a highlight spot on a sequence of visual images, moves the pointer spot over the image under manual control in continuous coordination with an audio program, and records the movement controlling signals for automatic operation on playback.

A variety of audio and audio-visual systems record information presented by a speaker or operator and play it back to an audience of one or more people. Common commercially available systems include audio cassettes, slide/tape systems, x-y writers, video tape, and sound motion pictures. These systems have been widely used for teaching, maintenance training, advertising, entertainment and as instructional guides at museums.

Criteria for evaluating such information systems include cost, channel capacity, ease of use, visual animation, and correlation between the channels. Ordinary audio cassettes have a low cost, but they have no visual channel. Information transfer is relatively inefficient since the producer must create visual images with words. x-y writers, which can be used to reproduce a pen-on-paper drawing in coordination with an audio program, are convenient to use and convey information effectively. Their use is limited, however, to "blackboard" visual subjects, and their cost is high. Video tape and sound motion pictures are also effective communication media, but their cost is likewise high. As a result of these drawbacks, slide/tape systems are most frequently used for low cost, recorded person-to-person information transmission. However, one disadvantage of slide/tape systems is that there is visual stimulation only on changing the slides. Another disadvantage is that the correlation between the audio and the visual channels is typically poor since the speaker cannot readily and accurately direct the attention of the viewer to the portion of the slide image he is discussing.

One solution to these problems has been to use a pointer to direct attention to a portion of a slide. During a "live" presentation, the lecturer can simply point to portions of a slide image projected on a screen. U.S. Pat. Nos. 2,848,922 and 3,220,305 describe apparatus in which a manually-controlled movement of a bright spot superimposed over the slide image acts as a pointer. None of this apparatus, however, has a recording and playback capability. U.S. Pat. Nos. 3,522,037 to Stern and 3,804,503 to Sissom describe front screen projection systems in which signals from a prerecorded tape control a stepping switch which sequentially energizes fixed light sources that act as pointers.

British Pat. No. 1,435,510 to Faulkes describe a more flexible pointing system adapted for use with a sequence of front projected slides. A pointer device, including a light source, an apertured mask containing a slit, and a projection lens, projects an image of the slit on the screen. The signals for an audio program, slide change signals, and signals for controlling the movement of the pointer device are recorded in alternating sequence on magnetic tape. A manually controlled "joystick" is the position transducer that generates the pointer control signals during recording. These signals are demodulated and actuate two motor-driven cams that move the entire pointer device horizontally and vertically to shift the pointer image on the screen.

While the Faulkes system provides significantly greater flexibility and audio-visual correlation than the Stern or Sissom systems, it has significant shortcomings. First, the movement of the pointer image is not continuous and in parallel with the audio program; it alternates with the audio program. Thus, the Faulkes pointer mechanism is not capable of executing a continuous path on the visual image at the same time as the operator discusses it. The resultant sequential alternation between the audio and the visual channels, and a low level of visual stimulation, limit the communication effectiveness of the system. A second, related deficiency is that the Faulkes arrangement for moving the pointer, which is a key component of the system, is slow, insensitive and cumbersome. This is because the motor-cam arrangement shifts the entire pointer assembly, which has a comparatively high inertia. These characteristics do not lend themselves to an economical system for continuous and rapid pointer motion. Third, Faulkes provides no solution to problems associated with tape recording, such as variations in tape speed and particularly acceleration on start up, noise, drops in the signal strength ("drop out"), and start up at a random point in the tape due to a stop and restart or a power interruption. Fourth, Faulkes does not provide a system that can be readily mated to a standard slide projector, to a rear screen viewer, or to other media such as motion pictures and television. Finally, Faulkes does not address the parallax problems that arise when the visual image and the pointer spot originate from two spaced-apart sources and the projection distance is varied.

It is therefore a principal object of this invention to provide an automatic pointer system for a sequence of projected visual images that is movable continuously in close coordination with an accompanying recorded audio program.

Another object is to provide a pointer system that is highly simple and convenient to use, and which includes a manual control element that is held and manipulated with one hand so as to be particularly suitable for the recording of pointing motions in the course of a 'live' lecture.

Yet another object is to provide a pointer system that is of relatively low cost.

A further object is to provide a pointer system that is rugged and highly reliable and, in particular, is not susceptible to malfunction due to random restart, noise, dropout, power loss or tape speed variations.

Still another object is to provide a pointer system that is adaptable to a variety of audio-visual media and in particular operates with any commonly used slide projector.

SUMMARY OF THE INVENTION

An automatic, programmable pointer mechanism for audio-visual systems has a pointer movement mechanism that directs a bright highlighting spot of light over each of a sequence of visual images. A control device continuously and rapidly generates a series of output signal sets, each of which corresponds to a two-dimensional position in a plane selected manually by an operator. In a preferred form, the control device is structured to be held in one hand with the placement and movement of the thumb selecting and continuously varying the position. An electronic circuit converts the signal sets into a digital form suitable for recording on magnetic tape simultaneous with the speaker's words or other audio program. The circuit also decodes the recorded signals to automatically and repeatably control the operation of motors that drive the pointer movement mechanism so that movement of the pointing spot follows the recorded movement of the operator's thumb. The circuit includes stages that ensure only complete and well spaced signal sets to control the motors.

During the initial recording, the signal sets drive the pointer mechanism directly to provide immediate visual feedback to the speaker or operator. Thus for example, a lecturer giving a 'live' lecture and watching the screen will move his thumb on the hand-held control device so as to move the highlighting spot in accordance with the information he wishes to communicate. By visual feedback he will automatically and naturally generate a continuous sequence of control signals that will cause the pointer mechanism to execute the desired motions. But because these same control signals are simultaneously recorded on tape, later playback of the tape will reproduce exactly the pointer movements that obtained during the live lecture.

In front projection slide/tape systems, the pointer movement mechanism preferably utilizes a thin opaque mask with a central aperture that defines the highlighting spot. The mask is supported on two generally rectangular frames oriented at right angles to one another. A pair of parallel, spaced apart transparent panels support a set of idler rollers that engage each frame so that it can move freely along its longitudinal axis. A rack on an outer longitudinal edge of each frame engages a gear driven by a stepping motor through a gear train. The pointer mechanism, including the circuitry and a tape or cassette recording device, are preferably secured in a housing adapted to receive a standard rotating-tray type slide projector with its projection lens generally aligned with and positioned over a separate projection lens for the pointer. A mechanical linkage between a focus adjustment on the pointer projector and a frame limit switch provides an automatic correction for parallax effects due to the separation between the projection lenses when the lens-to-screen distance is changed. Another parallax correction scheme uses the pointer to outline the periphery of a centered visual image and the orientation of the slide projector is adjusted to align the actual visual image within this outline.

In a rear projection slide viewer, the pointer movement mechanism is preferably a mirror mounted for twisting movement about both a vertical axis and a horizontal axis under the control of two stepping motors. The projected slide image and the pointer image are united at a partially-silvered mirror. The slide tray preferably carries indicia associated with each slide. The viewer has a detector that reads the indicia and generates a corresponding electrical signal to ensure correlation between the audio and the visual channels.

These and other features and objects will be more readily understood from the following detailed description of the illustrated embodiments which are to be read in light of the accompanying drawings.

BRIEF DESCRIPTION OF THE DRAWINGS

FIG. 1 is a simplified perspective view of an automatic pointer apparatus according to the invention and mounting a standard front screen slide projector;

FIG. 2 is a simplified perspective view of a rear projection viewer that incorporates an automatic pointer mechanism according to the invention;

FIG. 3 is a perspective view of a hand-held device for the manual control of the position of the pointer image generated by the apparatus shown in FIG. 1;

FIG. 4 is a perspective view of an alternative manual control device;

FIG. 5 is a view in front elevation of a preferred embodiment of a pointer movement mechanism according to this invention;

FIG. 6 is a view in side elevation of the mechanism shown in FIG. 5;

FIG. 7 is a view in front elevation of an alternative form of mask-type pointer movement mechanism according to the invention;

FIG. 8 is a perspective view of a twisting mirror pointer movement mechanism according to the invention;

FIG. 14 is a schematic functional block diagram of an automatic pointer mechanism according to the invention;

FIG. 15 is a more detailed schematic block diagram of a portion of the control circuitry shown in FIG. 14;

FIG. 15A is a more detailed schematic diagram of a portion of FIG. 15.

DETAILED DESCRIPTION OF THE ILLUSTRATED EMBODIMENTS

Figure 9:
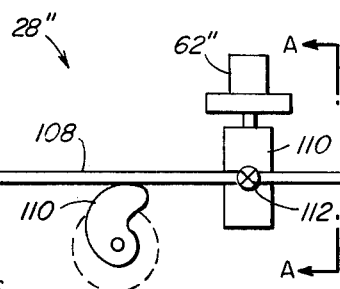
FIG. 9 is a view in side elevation of a fiber optic pointer movement mechanism according to the invention.

FIG. 1 shows an automatic, programmable pointer apparatus 12 adapted for use in conjunction with a conventional front screen slide projector 14 that has a rotating slide tray 16 mounted over the projector. The projector 14 directs the image of a slide through a projection lens 18 to a conventional screen (not shown). The pointer apparatus 12 has a housing 20 with a step-like recess 20a that is adapted to receive and locate the slide projector 14.

A conventional two-track audio cassette recorder 22 mounted within the housing 20 records and plays back an audio program and intermittent slide change signals to correlate the operation of the projector 14 with the taped audio program. As discussed in greater detail below, the recorder 22 also records and plays back a sequence of electrical signal sets or words that automatically control a pointer image or spot superimposed on the projected slide images.

Also within the housing 20 are a light source 24, an associated condensing lens 26, a pointer movement mechanism 28 (described in detail with reference to FIGS. 5 and 6) and a pointer image projection lens 30, which together produce a bright pointing spot. The pointer movement mechanism 28 controls the position and movement of the pointing spot superimposed on the projected slide images.

An electronic circuit 34 (described below with reference to FIGS. 14–16), also mounted in the housing 20, interconnects the recorder 22, the pointer movement mechanism 28 and an external, manual pointer control device 36 (shown in FIGS. 3 and 4). The pointer image can have a variety of shapes such as an arrow or a sequare, but is preferably a small disc of white light. The pointer disc need not be brighter than the brightest area of the slide image in order to effectively highlight the pointed area. It has been found that a combined pointer spot and image brightness that is one and one-fourth that of the brightest image area is adequate.

FIG. 2 shows a conventional rear projection slide viewer 38 modified to include an automatic pointer apparatus according to this invention. The illustrated viewer uses the same rotating slide tray 16 as the front screen projector of FIG. 1. As the tray indexes, a slide drops through a slot in the viewer where it is illuminated by a beam of light 39. The image thus formed is directed onto a viewing screen 38a by a set of mirrors mounted within the viewer including mirrors 41 and 43. In addition, a light source 24', lens 26', a circularly-apertured mask 100 and a pointer projection lens 30' within the viewer generate a pointer image on the screen. The pointer image is positioned and moved over the screen 38a by a tilting-mirror pointer movement mechanism 40 (FIG. 8) whose function is equivalent to that of the mechanism 28 of FIG. 1. As FIG. 2 shows, the mirror mechanism 40 includes a partially-silvered mirror 42 which combines the pointer image and the slide image before they strike the large final mirror 43 that "feeds" the viewing screen 38a. The silvered mirror 42 favors the slide image to maintain good image brightness. The brightness of the pointing spot plus image is again chosen to be at least 1¼ times that of the brightest area of the slide image. The viewer 38 also includes an audio recorder 22' which reproduces a recorded audio program with a speaker 38b. The rear projection viewer is particularly useful as an individual instruction device, an advertising display at a trade show, or an explanatory device at a museum exhibit.

Figure 12:
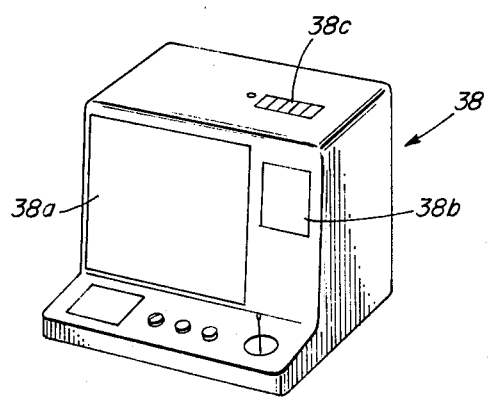
FIG. 12 is a simplified perspective view of the rear projection viewer shown in FIG. 2 with the slide tray removed.
Figure 13:
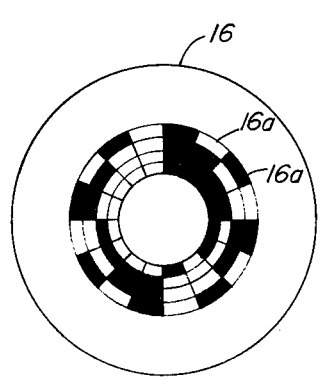
FIG. 13 is a bottom plan view of the slide tray shown in FIG. 2.

FIGS. 12 and 13 show an arrangement for identifying the actual slide being shown by the viewer 38. The tray 16 is divided into sectors 16a, each of which corresponds to a slide. The bottom of each sector carries a pattern of black and white areas coded to uniquely identify it. The viewer 38 contains a detection device 38c that reads the code of the sector 16a associated with the slide being viewed and generates a correspondingly coded electrical signal. This signal can be recorded on the tape or cassette of the recorder 22, together with the output signals of the control device 36 and the audio program, to provide the audio/slide synchronization in a manner to be more fully described in the following discussion. In this manner slides may be selected from the Tray 16 for display in any select sequence regardless of the actual locations of the individual slides in the tray.

FIG. 3 illustrates a preferred form of the manual pointer control device 36 which has a 'tennis racket' grip 36a. FIG. 4 shows an alternative control device 36' having a box-like configuration. In either form, the control device is structured and dimensioned to be held conveniently in one hand with control provided by the position of a thumb on a generally rectangular position transducer or pad 44. Immediately below the pad 44 are two switches which may be provided by smaller pads 46a and 46b constructed like the control pad 44. Pressure on any part of the pad 46a generates a forward slide change signal and pressure on the pad 46b generates a reverse slide change signal. A significant advantage of controlling the position of the pointing spot with the pad 44 instead of alternative devices such as a 'joystick' is that it can be held and used with one hand. In contrast, a joystick would have to be held in one hand and manipulated with the other unless it is mounted on a stable structure such as a joystick 48 mounted on the viewer 38 (FIG. 2).

The pad is a multilayer position transducing device whose electrical resistance, measured along vertical and horizontal directions, varies in response to the mean position of a mechanical force (e.g., thumb pressure) compressing the layers. More specifically, an alternating voltage (e.g. 60 hertz) is applied across each dimension of the pad, e.g. vertically and horizontally. In each direction, the pad acts as a potentiometer with the thumb pressure being equivalent to the sliding contact of the potentiometer. The physical position of the thumb on the pad therefore determines the resistance of the pad in the vertical (y) and the horizontal (x) directions, and the pad accordingly develops respective x and y output voltage analog pulse trains, wherein the individual pulse amplitudes correspond with the thumb position. In general, the configuration and size of the pad are determined by the range of normal human thumb motions and the desired image resolution. By way of illustration only, a pad 44 having a square 2 cm by 2 cm configuration has been effective for technically detailed slides subtending fifteen degrees and a spot diameter subtending one-half degree, both measured from the projector.

As described in greater detail below, the pair of voltage signals are converted into a sequence of digital signal sets or words at a sample rate of approximately ten words per second. The pad is sensitive to movement of the thumb pressure so that a slight 'rolling' of the thumb will produce closely corresponding changes in the output voltages. These signal changes are transformed into closely corresponding movements of the pointer image by the circuit 34 and the pointer movement mechanism 28 or 40. By observing the movement of the pointer spot, an operator quickly learns to control the movement of the spot with a high degree of accuracy. A pad suited for this use, including producing the x and y voltages with a high degree of independence, is sold by the I, Inc. company of Berkeley, California, under the trade designation 'Joypad'.

With reference to FIGS. 5 and 6, the illustrated pointer movement mechanism 28 has a generally square configuration defined by a pair of parallel, spaced apart plates 50, 50 formed of an optically transparent material such as plexiglass. Four posts 52 secure and space the plates 50, 50. A pair of rectangular, mutually perpendicular frames 54 and 56 are mounted between the plates on sets of idler rollers 58 rotatably secured to the plates 50, 50. Two rolls engage the inner edge of each longitudinal frame member so that each frame is movable along its longitudinal axis. The horizontal or "x" frame 54 therefore moves horizontally and the vertical or "y" frame 56 therefore moves vertically.

Each frame 54, 56 has a transverse cross member 54a and 56a, respectively, that supports a thin, opaque mask 60 by engaging the mask under a set of slide loops 62 projecting from the mask. The two loops on a given cross member move the mask with the associated frame, while the other two loops slide along the other cross member. Simultaneous movement of both frames moves the mask along an arbitrary curved path. The mask contains a central aperture 61 which defines the pointer image when illuminated by the light source 24. The aperture is shown as a circular hole which produces a highlighting disc on the screen.

A pair of electric stepping motors 62, 62 drive the two frames 54, 56 with each motor driving one frame through a small gear 64 mounted on the motor drive shaft 63, a large gear 66 that meshes with the gear 64, and a small gear 68 secured on a common shaft 70 with the gear 66. The shafts 70, 70 are rotatably mounted in the plates 50, 50. Each gear 68 meshes with a toothed rack 72 formed on one outer longitudinal sides of one frame. Rotation of the motor shaft 63 is thus transformed into translation of an associated frame.

Microswitches 74, 74 are positioned adjacent one transverse end member of each frame. The microswitches are spaced from the frame members so that each frame trips the microswitch when that frame is in an extreme limit or "home" position. In the home position the pointer image is at or near an edge of the visual image. The microswitch associated with the horizontal frame 54 is fixed, whereas the switch associated with the vertical frame is mounted on the end of a threaded rod 78 that travels in a fixed block 76. The rod 78 is linked by any conventional mechanical arrangement to the focusing control of the pointer projector 14 so that rotation of the focus control produces corresponding rotation of the rod 78. This rotation in turn causes the rod and the switch 74 to move lineally with respect to the frame 56. In particular, the lineal movement is selected so that the vertical "home" or "edge of visual image" position is shifted by the focusing adjustment to compensate automatically for the parallax effects of the changed focal distance.

Another arrangement for correcting the parallax problem utilizes the capability of the pointer apparatus to move over the visual image. Before the program begins, the pointer apparatus traces on the screen the periphery of an aligned visual image. This standard trace pattern can be generated by a read-only memory or by the operator playing back a cassette especially made for the purpose before he begins the program. If the screen is set at a different distance from the projector, or shifted laterally, the resulting parallax misregistration of the pointer spot on the outline of the visual image can be corrected by adjusting the spatial orientation of the slide projector until the outline of the projected slide image coincides with the trace pattern. This correction arrangement also facilitates the use of different types of slide projectors since it can also compensate for variations in the location of the slide projection lens relative to the pointer projection lens.

It should be noted that the foregoing pointer movement mechanism of FIGS. 5 and 6 has a low mass and low moving friction. As a result, it responds quickly and reliably to changes in the pointer position as dictated by changes in the position signal words, whether direct or recorded. This construction also has a comparatively low cost, is compact, and is durable in the hot, dusty environment inside a projection apparatus. Finally, the low mass and friction allow the use of relatively inexpensive stepping motor as opposed, for example, to servo-controlled motors.

FIG. 7 shows an alternative pointer movement mechanism 28' where a square pointer image is defined by the intersection of two mutually perpendicular slits 80, 81 formed across a pair of thin, elongated, low mass, opaque masks 82, 83, respectively. Each mask is movable along its longitudinal axis in a shallow guide channel 84a in a mounting block 84 preferably formed of plexiglass. As with the mechanism 28, coordinated longitudinal movements along mutually perpendicular axes generate movement of the pointer image along a curved path. The mechanism 28' can employ the stepping motors 62, of FIG. 5, each acting through the gear train 64, 66, 68 to engage racks carried on one longitudinal edge of the masks.

FIG. 8 shows the pointer mechanism 40 used in the viewer 38 of FIG. 2. The mirror 42 is mounted for pivotal movement about a horizontal axis on pins 88 secured in support arms 90, 90. A drive motor with suitable gearing located in a housing 92 controls the vertical position of a pointer image reflected off the mirror 42. The arms 90, 90 are secured on a rotating base member 94 mounted between a bracket 96 and a base 97. A second stepping motor and suitable gearing drive a gear assembly 98 that engages gear teeth formed around the periphery of the base 94. Rotation of the gear assembly 98 causes an opposite rotation of the base 94. The mirror 92 is thus rotated about a vertical axis to move the reflected pointer image horizontally across the visual image. While the mirror 42 has been described as partially silvered, it will be understood that it can be fully reflective and the slide and pointer images can be combined at the screen or at a separate, fixed mirror that is partially silvered.

Figure 9A:
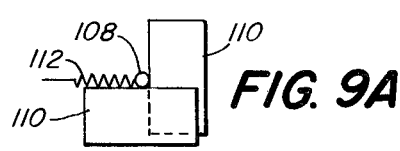
FIG. 9A is a view in side elevation taken along the line A—A of FIG. 9.

FIGS. 9 and 9A show another pointer movement mechanism 28'' that utilizes a fiber optic bundle 106 to transmit a pointer light beam from a light source to a projection lens. The cross-sectional shape of the fiber bundle defines the shape of the pointer image. A rigid structural rod 108 is secured at one end 108a in a gimbal mounting 109. The free end 108b is secured to and aligned with the end face 106a of the optical fiber bundle. Each stepping motor 62'' drives a cam 110 that engages the rod 108 near its midpoint. The cams are oriented at right angles to one another (FIG. 9A) and hence the two cams move the rod vertically and horizontally. Each cam 110 is wide enough to accommodate the full lateral travel of the rod induced by the other cam. The rod is "loaded" to urge it against the cam surfaces. The vertical cam is loaded by the weight of the rod and the fiber bundles, and the horizontal cam is loaded by a spring 112. Preferably a field flattening lens is placed opposite the output face 106a of the fiber bundle to compensate for the spherical locus of the end face as it is cammed over the full image which the pointer is highlighting.

Figure 10:
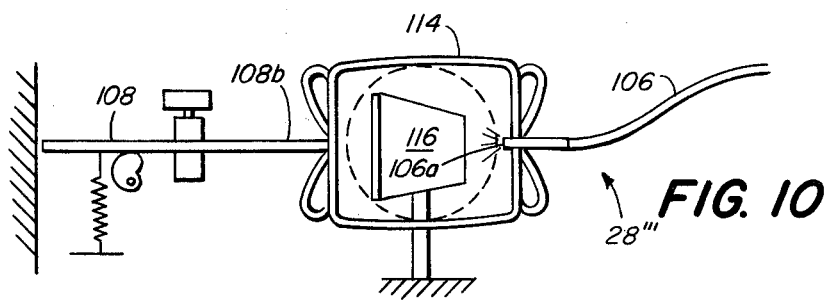
FIG. 10 is a view in side elvation of an alternative form of a fiber optic pointer movement mechanism.
Figure 11:
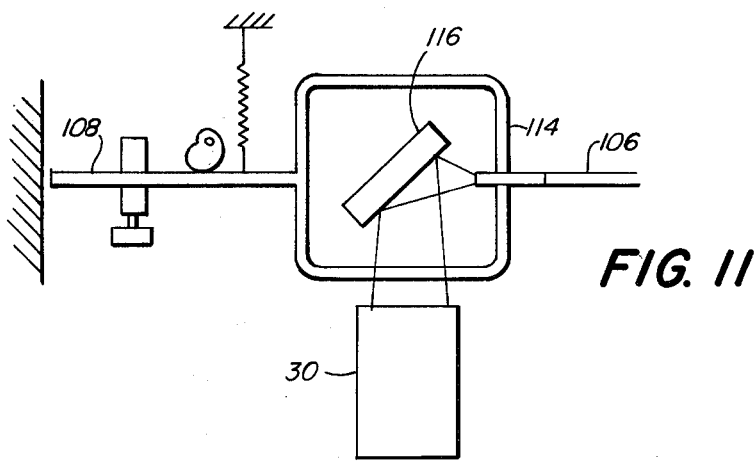
FIG. 11 is a top plan view of the mechanism shown in FIG. 10.

Another fiber optic mechanism 28''' for defining and moving the pointer image is shown in FIGS. 10 and 11. In this arrangement, the rod, cams and gimbal rod mountings are the same as in the FIG. 9 embodiment, but the output end face 106a of the fiber bundle is mounted in an open, x-shaped frame 114 opposite the free end 108b of the structural rod. The transmitted light beam is directed onto a fixed mirror 116 mounted within the frame 114 and angled to reflect the pointer image beam to a projection lens 30 (FIG. 1). Movement of the cam is transmitted by the rod 108 and the attached frame 114 to the fiber to produce the desired spot movement on the screen. It should be noted that in this embodiment, the locus of the emitting fiber end face 106a as the spot moves over the screen is spherical and concave toward the projection lens.

The aforementioned fiber optic mechanisms do not constitute a part of this invention and where disclosed to this inventor by Dr. William Plummer of Polaroid Corporation.

FIG. 14 is a block schematic diagram showing the organization of the electronic circuit 34, which includes conventional components for recording the audio program. The voltage signals generated by the control device 36, and in particular the position coordinate-associated voltage pairs over lines 117a, 117b, and the forward and reverse slide change signals over lines 117c, 117d, are applied to a coding circuit element 118. The illustrated coding element 118 converts the analog output voltages of the device 36 to digital form and applies the digital output signals to the tape recorder 22. The coding element also converts the output of an optional projector control element 119 into a suitable digital form for recording. The projector control element, for example, can correlate the slide identifying information generated by the device 38c with the other inputs to the recorder 22.

The illustrated coding element provides at its output a frequency shift keyed (FSK) signal, that is, a signal having high and low frequency levels to represent digital high and low voltage levels. The FSK signal can be reliably recorded on standard cassette magnetic tape. The illustrated conventional recorder 22 receives and records the frequency encoded signals on one tape track, and simultaneously records a commentary by the operator from a microphone 120 and preamplifier 121 on a second track of the magnetic tape.

Figure 16:
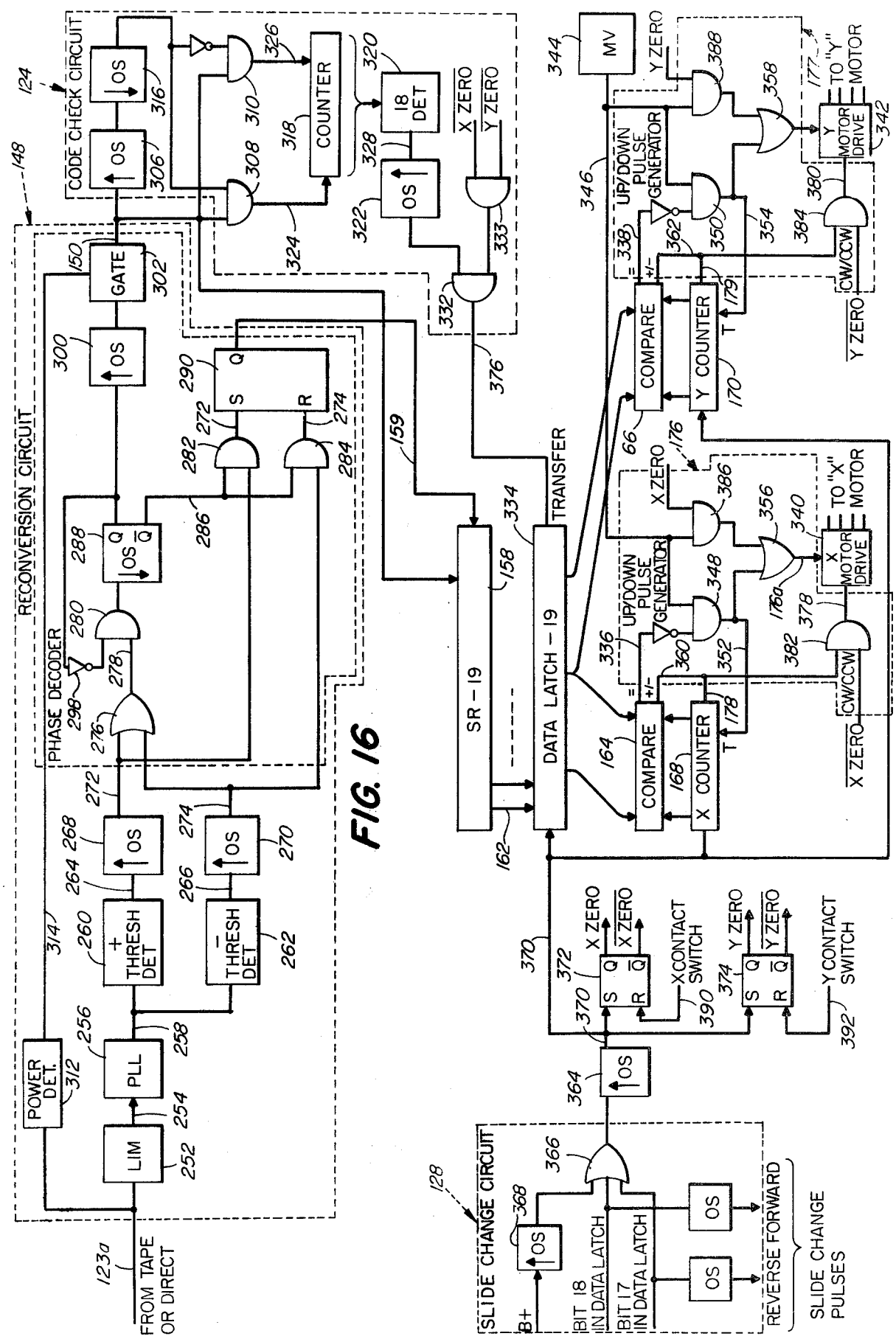
FIG. 16 is a more detailed schematic diagram of the other portion of the circuit shown in FIG. 14.

On playback, a decoding circuit or network 122 receives the FSK pointer position and slide change signals over lines 123a from the tape over lines 123b. Circuit 122 decodes the digital FSK signals and produces signals over lines 125 to actuate a pointer drive 126. Circuit 122 includes a code check circuit or network 124 as shown in FIG. 16 for ensuring that only 'good' words, that is words having properly spaced and timed data signals, activate the pointer.

A pointer drive 126, that includes the x and y stepping motors 62, 62, receives the output of the decoding network 122, for positioning the pointer. The pointer drive includes a circuit path to feed back to the decoding circuit 122 a signal representing the current pointer position for comparison with the position input command signals from the tape (or the coding network). The resulting comparison actuates the pointer drive 126 either to continue moving the pointer if the pointer position does not correspond to the required position or to stop when the comparison is null, i.e., when the pointer position corresponds to the desired position. The decoding network also decodes the slide change signals and directs the decoded change signals to a slide change circuit 128 of the slide projector. The audio program is reproduced on playback by a conventional amplifier 129 and speaker 129a (the speaker 38b in the FIG. 2 embodiment).

Referring now to FIG. 15, the coding box 118 has separate processing channels for the x and y output signals over lines 117a, 117b, from the manual pointer control pad 44 of control device 36. The processing channels include respectively smoothing, non-inverting operational amplifiers 130a, 130b, analog to digital convertors 132a, 132b and shift registers 200a, 200b. For each processing channel, the operational amplifiers 130a, 130b take the abovementioned x and y analog voltage pulse train inputs over respective lines 117a, 117b and provide at their respective outputs a smoothed analog signal having a magnitude which varies substantially in proportion to the voltage envelope of its respective input pulse train signal.

The operational amplifiers 130a, 130b apply their smoothed output signals over lines 136a, 136b respectively to analog to digital converters 132a, 132b, which may be of any convenient construction compatible with the timing and signal output requirements of the system. In the illustrated embodiment, each converter provides a plurality of eight-bit binary counts or words, each word of which represents the magnitude of a respective pulse from the x and y analog voltage pulse train inputs. The respective analog to digital converters 132a, 132b apply their eight-bit output binary words respectively over lines 192a, 192b to shift registers 200a, 200b for storage and later transmission to the tape recorder. Shift registers 200a, 200b in the illustrated embodiment, apply their stored data in serial sequence as described below, over a line 138 by way of a three bit mode register 194, the operation of which will subsequently be described. The digital output signal from the mode register 194 is then applied to a data conversion circuit 140 which takes the input digital data on line 202 and converts it to a form compatible for recording on a magnetic tape recorder, for example, the cassette tape recorder 22. Thus, conversion circuit 140 applies its output over lines 144 to the magnetic tape recorder 22.

Referring now to FIG. 16, in conjunction with FIG. 15, it can be seen that the output signals from tape recorder 22 over lines 123b have the same signal format as those applied to the tape recorder over line 144 from conversion circuit 140. The tape recorder 22 applies its output signals over line 123b to one input of a switch 146 (see FIGS. 14 and 15). The other input to illustrated switch 146 comes from the conversion cirlcuit 140 over line 123c. The output of switch 146 over line 123a is applied to a reconversion circuit 148. The reconversion circuit converts the signal information on line 123a into a train of voltage pulses over line 159, the resultant pulses having substantially the same relative timing and the same digital information content as the original data input to data conversion circuit 140 over line 202.

Thus, switch 146, controlled by the state of the tape recorder, selects the input for the reconversion circuit 148. When the recorder is in the RECORD state, switch 146 is moved to directly connect lines 123c and 123a, thereby connecting the output from the conversion circuit 140 directly to the reconversion circuit 148. When the recorder is in the PLAYBACK state, the switch 146 is moved to connect line 123b to line 123a, so that the reconversion circuit 148 receives its input directly from the recorder 22. The reconversion circuit 148 applies its output to both a code check circuit 124 and that remainder of the decoding circuit 122 which provides the drive signals to direct the pointer motor drives.

The code check circuit 124 receives pulse inputs from the reconversion circuit 148 over line 150, and, if the timing of those pulses is within predetermined time bounds, i.e., a timing window, the circuit 124 provides, after a full data word has been received a signal level over line 376 for storing the position portions of the data word in respective X and Y storage portions of a data latch 334.

As the determination of the receipt of a 'good' or 'valid' word is being made by the code check circuit 124, a shift register 158 receives and stores the input data over lines 159. The reconversion circuit 148 applies a shift timing signal to shift register 158 over lines 150. The shift register 158 applies its output to the data latch 334 over lines 162. There are eighteen output lines 162 in the illustrated embodiment, eight for each of the X and the Y axes, and two representing slide change information.

The outputs of the data latch 334 represent the desired position of the pointer. This desired pointer position is one input to respective X and Y comparison circuits 164, 166. The other inputs to the comparison circuits 164, 166 come from X and Y counters 168, 170 respectively. These counters 168, 170 receive input control signals over lines 352, 354 from respective up-/down pulse generators 176, 177 and their contents reflect the present location of the pointer. Generators 176, 177 also provide drive signals on lines 176a, 176b for the X and Y digital motor drives 340, 342. Drives 340, 342 control the X and Y stepping motors 62, 62 and hence the location of the pointer. Thus, by initiating the stepping motors at a known 'home' position, preferably at the beginning of each new slide, the binary count in the X and Y counters 168, 170 represent the location of the pointer in an X-Y coordinate system.

The X and Y comparison registers 164, 166 provide over the output lines 360, 362 voltage signals directing respectively the up/down pulse generators 176, 177 in which direction, if any, to step the stepping motors 62, 62 through digital motor drives 340, 342. By proper configuration of the pulse generator circuits 176, 177, the pulse signals over lines 179a, 179b drive, respectively, the X and Y stepping motors to move the pointer to the position called for by the data in the data latch 334 respectively.

Referring again to FIG. 15, it can be seen that lines 117a and 117b carry respectively the X and Y analog voltage input position pulse trains from the pad 44 to non-inverting smoothing amplifiers 130a, 130b, respectively. Each smoothing amplifier includes an operational amplifier 180 connected in a non-inverting configuration and having its positive input connected to a grounded smoothing capacitor 182. Each amplifier 180 and capacitor 182 operate to provide a smoothed analog signal having a magnitude which varies substantially in proportion to the voltage envelope of its input pulse train. Amplifiers 130a, 130b apply their smoothed output signals to the analog to digital conversion circuits 132a, 132b, respectively.

Each analog to digital converter 132a, 132b has a voltage level-shifting operational amplifier 184, a voltage-controlled oscillator 186, a gating circuit 188, and a binary counter 190. Each amplifier 130a, 130b applies respectively its output to one of the level shifting amplifiers 184 which in turn provide output signals over respective lines 192, 191, representative of the smoothed output of each amplifier 130a, 130b shifted to a voltage level compatible with the voltage controlled oscillators 186.

Each voltage controlled oscillator (VCO) provides an output signal whose frequency is directly related to the voltage level of the input signal and hence to the level of the signals at the output of the control pad over lines 117a, 117b. The variable frequency output signal of VCO 186 is gated by gates 188 according to a count time pulse train signal ($T_c$) on line 189 to provide a train of voltage pulse bursts, the number of individual pulses on each pulse burst being proportional to the voltage level of the corresponding input from the pad over lines 117a, 117b.

The count time pulse train ($T_c$) may be derived in a conventional manner in conjunction with a plurality of other timing pulse trains from a pulse train generating circuit 156 and clock 154. The output of each gate 188 actuates a corresponding counter 190 to provide a binary count or word representing the magnitude of the respective input to the analog to digital converter. In the illustrated embodiment, each counter 190 is at least, for example, a ten-bit binary counter; however, only the eight most significant bits are output over lines 192a, 192b. By eliminating the least significant bits, a jitter or uncertainty, associated with these bits, can be substantially eliminated and the stability and repeatability of the output count remains within desirable bounds. Thus each counter 190 provides a binary count or word representative of the frequency of the signal from a corresponding voltage controlled amplifier 186 as sampled by its respective gate 188 in accordance with the count time pulse train gating signal ($T_c$).

At the same time that the eight-bit counts are being generated on lines 192a and 192b, a three-bit mode word is being assembled for transfer into the three-bit mode shift register 194. Referring to FIG. 15A, the three-bit mode word has a first 'leading bit' which is always a '1', a second bit which indicates whether a forward slide change is to be actuated in association with this pointer word, and a third trailing bit which indicates whether a reverse slide change is to be actuated. Alternatively, the setting of the mode bits could be used to indicate the type of information contained in the following sixteen bit-positions of the word. For example, one setting could indicate that the following bits carried pointer position information. Another mode setting could indicate that the absolute address of a slide followed; such a coding would be suitable for the absolute slide addressing scheme indicated in FIGS. 12 and 13. Because the system is designed to transmit standard words which are divided into a 'mode' part and a 'data' part, it will be apparent that it is generally capable of controlling an arbitrary number of different desired operations.

The pulse train generating circuit 156 additionally provides a transfer pulse train ($T_r$) each pulse of which occurs at the end of each 'count time' pulse of the pulse train ($T_c$). Each 'transfer time' pulse of the pulse train $T_r$) over line 197 operates to transfer the forward and reverse slide change information into the three-bit mode shift register 194 while simultaneously transferring into eight-bit shift registers 200a and 200b, the pointer position data from counters 190a and 190b, respectively.

Beginning at the end of each 'transfer time' pulse, the shift registers 194, 200a and 200b which are connected in series to define a single nineteen-bit shift register, begin to generate a nineteen-bit serial output data stream over line 202. A gating circuit 204 generates a data shift signal over line 198 by gating a shift pulse train ($T_s$) over a line 206 with a transmit time pulse train signal ($T_t$) over a line 208. As is readily apparent, the shift pulse train ($T_s$) and the transmit time pulse train signal ($T_t$) are also provided by the pulse train generating circuit 156 and each 'transmit time' pulse provides a time window which starts at the end of each 'transfer time' pulse and which ends sufficiently before the beginning of the next consecutive 'transfer time' pulse to allow an interword blank period at least equivalent to a plurality of data bits before the beginning of the next data word. Thus, the shift register, made up of registers 194, 200a and 200b, transfers its stored digital signals in a serial sequence over line 202 to a phase encoder circuit 210 in the data conversion circuit 140.

The timing of the transfer pulse train $(T_r)$ and the pulse train $(T_s)$ over line 198 is such that the first shift pulse after each 'count time' pulse occurs after the 'transfer time' pulse has caused registers 194, 200a, and 200b to be loaded with new data.

The phase encoder circuit 210 converts the binary data of each 19 bit data word into a so-called 'self-clocking' digital format. Each '1' (high) in the binary data is recoded into a transition from low level to high level. Each '0' (low) is recoded into a transition from high level to low level. Thus for each bit level in the original data, there results a well-defined level change after phase-encoding. The code is termed self-clocking because an event (a level change) occurs in each and every bit position, whereas this is not necessarily the case in the original data word. A self-clocking code is essential in most communication systems because the receiver must always know what bit position it is currently looking at. The obligatory transitions in the phase-encoded signal provide this information ('clock ticks') as well as carrying the data itself.

Because a phase-encoded '1' is an up-transition and a '0' is a down-transition, the phase encoder must also generate appropriate 'auxilliary' transitions every time a '1' follows a '1' in the original data or a '0' follows a '0'. Thus after an up-transition for a '1', the phase encoder output must make an auxilliary transition to low prior to an immediately following '1'. At the receiver these auxilliary transitions must be ignored since they do not bear information. The reconversion circuit 148 of FIG. 16 both extracts the original data from the phase encoded signal and ignors the auxilliary transitions.

Phase encoder 210 accomplishes the conversion of the original data word to phase-encoded form by forming the logical EXCLUSIVE OR of the data bits over line 202 and the shift pulses $(T_s)$ from line 206. For this purpose it is desirable that pulse train generating circuit 156 produce shift pulses that are 'high' during precisely the first half of the interval between shift pulses and 'low' for the remainder of the interval. When shift pulses thus formed are EXCLUSIVE OR'ed (by well-known means) with the data over line 202, the result is a phase-encoding of the data having transitions (including auxilliary transitions) precisely as specified earlier.

The phase encoder 210 applies its output signal to a frequency shift keying (FSK) circuit 214 which converts the high and low levels of the phase-encoded signal into chosen high and low frequencies for recording onto the magnetic tape recorder 22. The FSK circuit may, for example, be a voltage controlled oscillator producing a sinusoidal output wave. The FSK circuit 214 then applies its output signals through an analog gate 216 by way of switch 146 to both the tape recorder 22 and the reconversion circuit 148. When enabled by a control circuit 141, the analog gate 216 acts as a short circuit for the FSK signal, which passes directly to the tape recorder over line 144. When not enabled by its control circuit 141, the analog gate is an open circuit, and the signal on line 144 is effectively at ground through resistor 217.

The control circuit as shown generally at 141 for the analog gate 216 is provided with AND gating elements 218, 220, and 224 and R-S flipflops 226, 228. The analog gate control circuit 141 receives input signals representing the status of the pad 44 X axis output voltage and of the forward and reverse switches, over lines labelled 'INPUT' and 'INPUT'. Thus, if neither the forward nor the reverse switch is actuated and if there is no input signal level from the pad X axis output, as represented by the smoothed output signal on line 230a, the output of an OR gate 232 is low (INPUT) and correspondingly the output line 234 of inverter 236 is high (INPUT). If either the forward or reverse switch is actuated or if there are input signals from the Pad X axis over line 230a, the output of OR gate 232 on line 238 is high and the output of inverter 236 over line 234 is low. These signals provide the first level of control for the analog gate 216.

The analog gate 216 ensures that the input to the tape recorder 22 is at ground in the intervals between data words, and when there is no input from the control device 36. The gate's control circuit 141 also prevents transmission of an erroneous data word in the event that the onset of position information from pad 44 occurs during the count time pulse $(T_c)$.

The control circuit 141 for the analog gate 216 operates as follows. If the signal level over line 234 is high, indicating that data pulses should not be passed through the analog gate, flipflop 228 is reset, and its output over a line 240 disables gate 224, and hence disables the analog gate 216. If the INPUT signal over lines 238 thereafter goes high (and the INPUT signal over lines 234 is low), the inverse of the count time signal (line 189) passes through AND gate 218 and sets flipflop 226. This allows the next occurrence of the count time signal to set flipflop 228, thereby enabling gate 224. Thus, the analog gate 216 passes signal input data from FSK circuit 214 only during a 'transmit time' pulse and only for those transmit times corresponding to a time interval during which there is either a forward or reverse activation of the slide machine or an input from the pad 44 X axis output. Gate 216 additionally prevents passage of a word corresponding to position information voltages whose onset occurred during a 'count time' interval and which were therefore inaccurately converted to digital form.

Referring again to FIG. 16, the reconversion circuit 148 receives the frequency shift keyed (FSK) signals over line 123a from either the tape recorder 22 or the data conversion circuit 140. Line 123a connects to a limiter circuit 252 which substantially squares off or chops the amplitude of the pulse signal output on line 123a by providing a high gain amplification and amplitude limiting function. Limiter 252 applies its output signals over a line 254 to a frequency detection circuit such as a phase locked loop 256. The phase locked loop 256 operates as a frequency to voltage converter and includes for example a free running frequency oscillator centered between the FSK frequencies. The output of the phase locked loop 256 is a time varying voltage signal representative of frequency levels in the tape input signal on line 123a.

The phase locked loop applies this signal over a line 258 to a positive threshold detector 260 and to a negative threshold detector 262. A positive going pulse from either detector 264 or 266 indicates the presence of high and low levels, respectively, in the signal. These levels now represent the phase encoded version of the original signal. Threshold detectors 260 and 262 apply their output signals over lines 264 and 266 respectively to one-shot multivibrators 268 and 270, respectively. The positive going signal levels on lines 264 and 266 trigger the respective one-shot multivibrator 268 or 270 and the triggered one-shot provides a single output pulse over lines 272 or 274. An OR gate 276 receives the outputs of one-shots 268 and 270 and provides, over lines 278 to an AND gate 280, a pulse train signal representing the sequential time of occurrence of the level transitions in the signal.

AND gates 282 and 284 also receive the outputs of one-shots 268 and 270, respectively. An enabling level on lines 286 from the "not" output (Q) of one-shot 288 normally enables gates 282 and 284 to pass a pulse on either of lines 272 and 274 to either set or reset a flipflop 290. The state of flipflop 290 provides an input level for the shift register 158. The level of the output of flipflop 290 over line 159 represents the original data, now decoded from its phase-encoded form. This data is shifted into shift register 158.

The pulse signal from one of the one-shots 268, 270 over one of lines 272, 274 initiates, on its trailing edge, the beginning of a pulse timing period for one-shot 288. Through a feedback circuit including an inverting gate 298, one-shot 288 inhibits and disables gate 280 so that further pulse signals on lines 272 and 274 do not reach and retrigger the one-shot 288. Similarly the "not" output of one-shot 288 over lines 286 inhibits and disables gates 282, 284 to block pulse signals from reaching the flipflop 290.

If the expected time between data pulses is "T" seconds, the timing of one-shot 288 is typically equal to 0.75 T. Thus, the next pulse allowed to pass through gates 280, 282 and 284 after a first accepted data pulse, cannot occur until after a time period equal to 0.75T. This prevents the 'auxiliary' transitions of the phase encoding from being accepted as data. In this manner, the one shot 288 gates the AND gates 282 and 284 in a manner that blocks out any 'auxiliary' pulses that may occur.

The output of one-shot 288 also initiates a one-shot 300, the output of which over line 150 causes the data bit output of flipflop 290 to be shifted into shift register 158. The output of one-shot 300 passes through an AND gate 302, provided the input signal power level is sufficiently high as will be described below. Thus, if gate 302 is in an enabled state, the output of one-shot 300 causes a data bit to be shifted into shift register 158. AND gate 302 also applies its output over line 150 to a one-shot 306 in the code check circuit 124.

A power detection circuit 312 monitors the signal power level input to reconversion circuit 148 over line 123a. If that power level is below a predetermined threshold, the output of circuit 312 over line 314 disables gate 302. Under these circumstances, wherein the level of the 'signals' over line 123a approaches the level of the noise on that line, the system is substantially 'shut down' and the pointer is not moved. When the signal level input on line 123a reaches or exceeds the predetermined threshold, the output of circuit 312 on line 314 again enables gate 302.

The code check circuit 124 receives the output of gate 302 over line 150. The code check circuit includes two one-shots 306 and 316, AND gates 308 and 310, a binary counter 318, a 'detect 18' circuit 320, and a one-shot multivibrator 322. The pulse signal from gate 302 over line 150 activates one-shot 306 on its leading positive edge and the output of one-shot 306 activates one-shot 316 on its trailing negative going edge. By choosing the pulse duration of one-shot 306 to be 0.9T where T again approximates the expected time between data pulses and by choosing the pulse duration of one shot 316 to be 0.2T, an effective timing window is provided having a duration of 0.2T starting at 0.9T after receipt of the previous data pulse and during which a next data pulse is expected to occur. This timing window is thus centered, at plus or minus 10 percent of the expected pulse rate, around the expected time of the next succeeding data pulse.

Counter 318 records the number of received data bits minus one. The counter 318 is zeroed by the first bit of a word, that is, by the first bit to arrive following the interword blank period. It is only during the time that one-shot 316 is actuated that counter 318 may be incremented by the signal pulse from gate 302 passing through gate 308. If the pulse arriving on line 150 is outside the 0.2T timing window provided by one-shot 316, instead of passing through gate 308 to increment counter 318, the pulse passes through gate 310 to reset counter 318 over line 326. This corresponds to an unaccepted data word.

When the nineteenth pulse of a good (acceptable) data word passes through gate 302, the nineteenth pulse corresponding to the last data bit of a 'good' word, it causes the counter 318 to increment to a count of eighteen. Upon detecting this count, logic circuit 320 provides an output signal over lines 328 to initiate one-shot 322. The output signal of one-shot 322 over line 153 passes through an AND gate 332 to cause a storage register or data latch 334 to replace its present contents with the contents of shift register 158. Thus, the code check circuit 124 insures that only data words having 19 properly spaced apart data bits or pulses are transferred to the data latch 334.

Data words which are in error as a result of tape dropouts, noise, and tape speed variations, particularly during tape start-up acceleration, will generally not be accepted by the stringent inter-bit timing test applied by the code check circuit, and will therefore not affect the current pointer position. In addition, 'truncated' words resulting from the recorder 22 being started or stopped at some point within a word will also fail the test since they will contain less than the full 19 bits. Thus the code check circuit 124, by applying a strict timing test to the incoming information, performs a valuable function by generally insuring that only valid data can affect the pointer.

The output of the data latch 334 comprises the two eight-bit binary counts, representing the next position of the pointer in the x and y directions, and the three-bit mode word representing instructions to move the slide projector forward or backward. The x and y outputs of the data latch 334 are, as previously described, inputs to the comparison circuits 164, 166, respectively. The other inputs to comparison circuits 164 and 166 are respectively the outputs of the x and y counters 168, 170 which represent the present location of the pointer.

The comparison circuits 164, 166 each have two output signal levels. A first output signal level on lines 336, 338, respectively, goes high when an equal comparison is reached between the contents of the data latch 334 and the respective x or y counter 168, 170. The second output over lines 360, 362 represents the direction in which the respective x and y drive motors 62, 62 must be moved by motor drives 340, 342 in order to bring the pointer into the position called for by the position data in the data latch 334.

A free running multivibrator 344 provides clock signal pulses over a line 346 to operate both the x and y motor drive circuits 340, 342 to align the pointer with the value of the position data stored in data latch 334. The multivibrator oscillation rate is chosen to be as high as is permissible for reliable stepping of the stepping motors. The multivibrator output signal over line 346 passes through the respective gates 348 and 350 of the x and y pointer circuitry, unless an 'equal comparison' has been reached, as indicated by a high signal on respective lines 336 or 338. The outputs of gates 348 and 350 are applied respectively to x and y counters over lines 352 and 354, and to the x and y motor drive circuits 340 and 342 through OR gates 356 and 358, respectively. The signals applied to the x and y counters on lines 352 and 354 increment those counters in the direction indicated by the output of the corresponding comparison circuit over respective lines 360 or 362. In addition, the signals passing through gates 356, 358 respectively cause, through drives 340, 342 the stepping motors to increment one step at a time in the direction indicated by the signals over lines 360, 362 respectively.

When the power is first applied to the circuit 34 or when a forward or reverse slide change command is implemented, the pointer resets to its 'home' or zero position. To implement this 'zeroing' function, a one-shot 364 receives from the slide change circuit 128, through an OR gate 366, an actuation signal level whenever the supply voltage Vo is first turned on, or whenever the forward data bit, i.e. bit 18 or the reverse data bit, i.e. bit 17, of the data latch register 334 is present. When thus activated, one-shot 364 applies its output pulse signal by way of lines 370 to clear the data latch 334, the x counter 168, the y counter 170, and the data bit counter 318. One-shot 364 also applies its output to set flipflops 372 and 374. With these flipflops set, further transfer pulses to the data latch 334 over lines 376 are inhibited because gate 332 is disabled by AND gate 333 which receives input signals X ZERO and Y ZERO from flipflops 372, 374. In addition, the outputs of flipflops 372 and 374 (for the x and y axes respectively) actuate the motor drives 340, 342 to rotate the stepping motors in the 'home' direction by placing a low signal level on lines 378, 380 respectively by disabling AND gates 382 and 384. In addition, the outputs of flipflops 372, 374 enable AND gates 386, 388 respectively to provide the stepping clock pulses to the motor drive circuitry. When the pointer reaches its home or zero position, as indicated by closure of microswitches 74 of FIG. 5, the respective flipflops 372, 374 are reset, separately for the x and y axes, thereby release the decode circuitry to perform its normal function. However, both x and y flipflops 372, 374 must be reset (by the illustrated contact closures over lines 390, 392 respectively) before transfer pulses are applied through gate 332 to data lach 334.

The zeroing function just described is important because its inclusion permits driving the pointer with inexpensive stepping motors, and eliminates the need for a 'closed-loop' drive system. In a conventional closed-loop system, the pointer mechanism would be driven by torque motors in such a way that when the desired position was reached, the current causing the motors to exert torque would become zero. Achievement of the desired position would be measured (thus closing the loop) either by variable electrical components associated with the motors, or by optical sensing of motor position (such as a shaft encoder) or of the pointer position directly (by similar optical means). Sensing by electrical compnents is undesirable since such components invariably drift with time and would require periodic readjustment. Optical sensing would require a plurality of photodetectors focussed in such a way as to reliably detect very small movements, thus adding significant expense to the system. In addition, the use of torque motors would required supplemental circuitry to ensure that the damping and dynamics of the motors resulted in accurate following of the information signal.

All of these problems are eliminated with the use of stepping motors, since issuance of a specific number of pulses to such a motor results in a specific and predictable displacement. The system can thus be operated in an open-loop manner. It is only necessary to be sure that the motors 62 start off at a known home position; then each ensuing displacement will result in a known absolute position. This is ensured in the circuit of the invention by zeroing the motors 62 upon each slide change.

Should a few drive pulses momentarily fail to move either of the motors 62 during pointing, the resultant error will be present only for the duration of the current slide. The next slide change will zero the motors 62 and eliminate the discrepancy. Furthermore, the fact that the zeroing function occurs every time power comes on prevents the drive circuitry from losing track of the pointer position if power is accidentally interrupted.

While a particular preferred embodiment has been described with reference to FIGS. 14-16 for coding and decoding pointer position signals to provide the logic operations and functions for practising the invention — including among others to ensure that only valid data is acted upon — those skilled in the art can provide constructions and embodiments to provide the same or functionally equivalent operation.

There has been described an automatic programmable pointer apparatus for audio/visual systems that moves a visual pointer over a visual display in continuous and close coordination with an audio program while being highly simple to use, reliable and having a low cost of manufacture. Although the invention has been described with reference to slide projectors and viewers, a system embodying features of the invention can also be used in conjunction with other equipment such as sound motion pictures and television. When applied to television, the highlighting spot can be created by increasing the intensity of the scanning electron beam at the appropriate portions of the raster. A standard coded signal can generate the highlighting spot. The position control signals can be converted into a time interval count since the electron beam scans the raster in a highly defined pattern over a precisely controlled time interval. Also, while the invention has been described with reference to a pointer apparatus that mounts a separate, conventional slide projector, it is also contemplated that a slide projector can be built into a common housing with the pointer apparatus. These and other modifications will be apparent to those skilled in the art from the foregoing description and the accompanying drawings. Such modifications are within the scope of the appended claims.

What is claimed is:

1. Apparatus, which may be used with a film slide projector of the type which can be automatically controlled to project any one of a plurality of film slide transparencies in concert with an audio presentation, for projecting a pointer image superposed with respective ones of the projected film slide images and for controlling the position of the pointer image with respect to the projected film slide image, said apparatus comprising:

means for projecting a pointer image including drive means selectively energizable for moving the pointer image over a determinate area generally corresponding to the area of the projected film slide image;

means responsive to manual manipulation for generating electrical signal information in a sequence of digital word formatsin correspondence with a related audio presentation, each digital word of which designates a select position of the pointer image in said determinate area, said digital word formats being generated at a rate to produce a plurality of said digital word formats for each slide transparency;

means for converting said sequence of digital word formats to an electrical signal form suitable for recording on a conventional tape recorder;

means for reconverting said recordable electrical signal form back to a sequence of digital word formats, each digital word again corresponding to a select one of the plurality of film slide transparencies and a select position of the pointer image in said determinate area; and control means responsive to each of said digital words for causing the automatic slide projector to project the select film slide transparency designated by each said digital word and to drive said projction drive means to move the pointer image to the select position designated by each said digital word, the production rate of said digital word formats allowing for smooth and continuous movement of the pointer image during the projection of each film slide transparency in direct simultaneous corresponding with the audio presentation.

2. The apparatus of claim 1 wherein said projection drive means may be operated to move the pointer image to a select "home" position in said determinate area and said control means is also responsive to a digital word designating a different film slide transparency from the film slide transparency designated by the previous digital word of said digital word sequence to provide the appropriate electrical signal to drive said projection drive means to move the pointer image to said select "home" position.

3. The apparatus of claim 2 wherein said control means is also responsive to the energization of said apparatus to provide the appropriate electrical signal to drive said projection drive means to move the pointer image to said select "home" position.

4. The apparatus of claim 3 wherein said projection drive means comprises a pair of stepping motors which respectively move the pointer image in mutually perpendicular directions and said control means comprises a pair of counter registers connected such that the contents thereof respectively represent the number of clockwise drive pulses minus the number of counterclockwise drive pulses issued to said stepping motors since said projection drive means moves from said select "home" position, said control means further operating to provide drive pulses for driving said stepping motors respectively in either a clockwise or counterclockwise direction in accordance with the difference if any between the position represented by a digital word and said counter contents.

5. The apparatus of claim 1 wherein each digital word of said sequence comprises a determinate number of discrete data bit pulses and said apparatus includes a code check circuit for generally insuring that each data word transmitted from said reconverting means comprises said discrete numbers of data bit pulses.

6. The apparatus of claim 5 wherein each digital word of said sequence is separated from a preceeding digital word in said sequence by an interword blank period equivalent to a plurality of discrete data bit pulses and said code check circuit includes a counter circuit which automatically resets in response to the first data bit pulse following an interword blank period and provides a select output signal upon receipt of said determinate number of discrete data bits, said code check circuit also including means for gating said counter circuit to only count data bit pulses received within a determinate timing window countered about the expected time for each data bit pulse, said control means comprising a shift register and a data latch, said shift register being connected to receive the sequence of digital word formats from said reconverting means and said data latch being connected to receive the contents of said shift register in response to said select output signal from said counter circuit.

7. The apparatus of claim 1 wherein said recordable electrical signal from comprises frequency shift keyed signals and said reconverting means comprises: a limiter circuit for chopping the amplitude of the frequency shift keyed signals, a frequency to voltage converter to receive the output signal from said limiter circuit and provide a time varying output voltage signal representative of the frequency levels of the frequency shift keyed signals, positive and negative threshold detectors for receiving the outut signal from said frequency to voltage converter to provide a phase encoded version of said electrical signal information and phase decoding circuitry for converting the phase encoded version of said electrical signal information from said threshold detectors back to the digital word sequence.

8. The apparatus of claim 1 wherein said converting means includes a phase encoder circuit for converting the digital word sequence input signal by exclusive OR'ing it with a train of symmetric shift pulses to a "self-clocking" phase-encoding format wherein each high voltage data bit phase "1" is recorded into a transition from a low voltage level to a high voltage level and each low voltage level bit pulse "0" is recorded into a transition from a high voltage level to a low voltage level thereby providing the self-clocking function since a voltage transition occurs for every data bit pulse, and a frequency shift keying circuit for converting the phase-encoded signal from said phase encoder circuit into select high and low frequencies suitable for recording by conventional magnetic tape.

9. The apparatus of claim 8 wherein said converting means includes a gating circuit for selectively passing the output signals from said frequency shift keying circuit to the tape recorder, said apparatus also including a control circuit for controlling said gate to insure that the output signal from said conversion means to the tape recorder is at ground potential during selected intervals between digital words and that an erroneous digital word beginning during one of said selected intervals is not transmitted from said converting means to the tape recorder.

10. The apparatus of claim 1 wherein said signal generating means comprises: a position transducing device for providing two analog output voltages indicative of a manually imposed position on said transducing device, each of said analog voltages being respectively indicative of manual controlled movement along each of a pair of mutually perpendicular directions, and a slide change transducing device for providing a digital voltage output signal indicative of an intended change in the projected film slide, an analog to digital converter including a voltage controlled oscillator for converting each of said analog output voltages from said position transducing device to an output signal whose frequency varies in direct correspondence to the voltage level for said analog voltage, means for gating each of said variable frequency signals according to a select count time pulse train to provide a train of voltage pulse bursts with the number of individual pulses in each burst and for providing a digital word representative of each count, at least one shift register of sufficient capacity to store at the same time each of the digital words from said counting means and said digital voltage output signal from said slide change transducing device, said shift register thereafter being responsive to a data shift pulse to generate an output digital word, said data shift pulse occurring in a continuous train to provide said sequence of digital word formats from said converting means.

11. Apparatus for moving a projected pointed image over a determinate area generally corresponding to a projected film slide image, said apparatus comprising:

an opaque mask having one aperture therethru which defines a pointer image when illuminated by a light source;

a first frame member slidably connected to said mask for movement along a first longitudinal axis;

a second frame member slidably connected to said mask for movement along a second longitudinal axis substantially perpendicular to said first axis;

means for mounting said first frame member for reciprocal sliding movement along a path in a direction substantially perpendicular to said first longitudinal axis and for mounting said second frame member for reciprocal sliding movement along a path in a direction substantially perpendicular to said second longitudinal axis, and drive means for slidably driving said first and second frame members, said drive means comprising rotatably driven first and second portions drivably engaged against said first and second frame members respectively such that rotation of said first drive portion against said first frame member operates to move said first frame member and said mask aperature in a direction perpendicular to said first longitudinal axis while rotation of said second drive portion against said second frame member moves said second frame member and said mask aperture in a direction perpendicular to said second longitudinal axis.

12. The apparatus of claim 11 including first and second microswitches stationed for signaling respectively when said first and second frame members are moved to respective terminal "home" positions at one end of the respective paths of reciprocal sliding movement.

13. The apparatus of claim 11 wherein said first and second frame members include respectively first and second elongated toothed racks while said first and second drive portions comprise respectively first and second pinion gears engaged respectively to said first and second racks together with first and second stepping motors for rotatably driving said first and second pinion gears respectively.

14. The apparatus of claim 12 wherein said mounting means comprise a pair of parallel, spaced apart, transparent plates together with a plurablity of idler rollers disposed for rotation between said plates for rotatable engagement with respective ones of said frame members.

* * * * *